United States Patent [19]

Piche

[11] 4,170,513

[45] Oct. 9, 1979

[54] RECOVERY OF TUNGSTEN CARBIDE FROM SCRAP MINING BITS

[75] Inventor: Fernand J. Piche, Rutherglen, Canada

[73] Assignee: Fernand Piche Enterprises Limited, Rutherglen, Canada

[21] Appl. No.: 913,049

[22] Filed: Jun. 6, 1978

[51] Int. Cl.$^2$ ............................................... C23F 1/02
[52] U.S. Cl. .................................... 156/656; 156/344; 156/631; 156/664
[58] Field of Search ............... 156/631, 634, 637, 645, 156/654, 656, 664, 344; 29/526.5, 527.6, 557; 252/79.2

[56] References Cited

U.S. PATENT DOCUMENTS

| 3,375,181 | 3/1968 | Koech | 156/645 X |
| 4,106,977 | 8/1978 | Klaus | 156/656 X |

FOREIGN PATENT DOCUMENTS 1019641  2/1966  United Kingdom ..................... 156/654

*Primary Examiner*—William A. Powell
*Attorney, Agent, or Firm*—Sim & McBurney

[57] ABSTRACT

Tungsten carbide inserts are recovered from scrap mining bits by treatment in a sulphuric acid bath to eat away part of the steel surrounding the inserts and then heating the bit and vibrating the heated bit to knock out the inserts. In a modification used on cross-type bits, heat and vibration alone are used.

14 Claims, No Drawings

RECOVERY OF TUNGSTEN CARBIDE FROM SCRAP MINING BITS

FIELD OF INVENTION

The present invention is directed to the recovery of tungsten carbide inserts from drilling bits.

BACKGROUND TO THE INVENTION

Mining bits for rock drilling and the like utilize tungsten carbide as the abrading medium and the tungsten carbide is in the form of short cylinders or buttons, known as inserts, embedded in and projecting from sockets in a steel body. In use, the tungsten carbide inserts become ineffective as a result of wear and the bit thereby is rendered useless.

Worn mining bits still contain considerable quantities of tungsten carbide, however. In view of the raw material cost of tungsten carbide, it is economically attractive to recover the worn inserts from the scrap mining bits for recycle to produce new bits.

SUMMARY OF INVENTION

In the present invention, scrap mining bits are subjected to a three-step operation. In the first step, the scrap bits are immersed in an acid bath, in the second step, the scrap bits are heated and, in the third step, the bits are vibrated to dislodge the inserts from the heated steel body.

GENERAL DESCRIPTION OF INVENTION

There are three types of mining bits, termed tricones, roller bits and cross-bits. The invention is mainly applicable to the first two types, as these are the more difficult from which to remove the inserts. A modified procedure is also provided in this invention applicable only to the cross-bit type.

The first step of the process of the invention involves immersion of the scrap bits, as is in the case of the tricones and generally after splitting into two in the case of the roller bits, in a bath of acid, preferably sulphuric acid. For speed and economy of operation, a large plurality of bits are processed simultaneously, typically 50 to 100 at a time, although individual bits may be treated, if desired.

The acid bath treatment is effected for a time sufficient to at least partially eat away the steel in which the inserts are embedded. In worn bits, many of the inserts have metal burrs which overlay the insert end and which must be removed if those inserts are to be recovered. The acid treatment is effected at least long enough to carry out removal of these burrs, and preferably to result in all the inserts projecting from the surface of the bit.

Usually, a minimum acid treatment bath time is about 12 hours and the bath usually is agitated to maintain fresh acid in contact with the bit surface during the treatment. If the acid bath becomes depleted during this period, a fresh acid bath is made up and the acid treatment continued in the fresh bath.

In this invention, there is a balance between the acid treatment time once the minimum time is exceeded and the temperature to which the treated bits must be heated to enable the bits to be removed, with lower heating temperatures being required for longer acid bath treatments. Preferably, the acid treatment is effected for about 20 to 24 hours.

The strength of acid used in the acid treatment is not particularly significant and usually an acid strength of about 10 to 15% by weight is used. Sulphuric acid is the preferred acid and the acid bath is usually made up by adding concentrated sulphuric acid to water containing the bit or bits.

The heat of dilution of the sulphuric acid increases the bath temperature and it is preferred to maintain the treatment bath at an elevated temperature during the treatment to speed up the steel dissolution. The preferred elevated temperature may be maintained in any convenient manner, such as, by the application of steam. A temperature in the range of about 150° to about 200° F. is preferred.

Once the acid treatment is completed, the acid treated bits are washed free from surface acid and then heated to a high temperature to loosen the inserts in their sockets sufficiently to enable them to be dislodged upon vibration. The inserts are preferably heated to about cherry red colour at about 1600° F. While being maintained at that temperature, the bits are subjected to strong vibration, for example, by striking the same with a jack hammer, to cause the inserts to jump out of the heated bit.

The combined acid treatment and heating-vibration operations which are used in this invention provide an economic and effective method of recovery of tungsten carbide inserts at high recovery rates from tricones and split roller bits. The procedure has considerable advantages over the use of heat treatment and vibration without acid treatment, since, while some inserts may be recovered following this latter procedure, the recovery rate is low as a result of the presence of turned-over burrs preventing many of the inserts from being dislodged.

The procedure of the invention is also beneficial when compared with acid treatment alone. It is conceivable to utilize acid treatment to consume all the steel and leave the inserts. As compared to the present invention, this procedure is very time consuming and requires large quantities of acid to be effective.

A modification of the above-described procedure is useful for cross-bits. Since the worn inserts of cross-bits are usually unencumbered by turned-over burrs, the acid treatment may be omitted.

The bits are heated to a high temperature and then subjected to vibration to remove the same. In a preferred manner of effecting the latter procedure, the bits are fed to a countercurrent rotary kiln operating at a high temperature of about 1300° to about 1350° C., and are discharged from the kiln onto an inclined grate through which the inserts fall for collection in a suitable receptacle.

The tungsten carbide inserts recovered by the procedures of the invention may be reprocessed into new inserts for fresh bits by any convenient method.

EXAMPLE

About 70 scrap tricone mining bits were placed in a 4'×8' tank and covered with water to a depth of about 12 inches. About 1 inch of concentrated sulphuric acid (66° Bé) was added to the tank. After about 2 hours, steam was applied to the solution to maintain a bath temperature of about 150° to about 200° F. for about 12 hours.

After the end of that period, the spent solution was drained off, the bits were thoroughly rinsed, the tank refilled with water and sulphuric acid and the procedure was repeated.

At the end of the treatment period, the spent solution was drained and the tricones were again rinsed. Random visual examination of the bits showed that steel had been eaten away and the inserts were projecting from the surface.

The cones then were heated on a gas forge to cherry red heat and hit with a jack hammer to cause the bits to jump out. Recoveries of the inserts from the bits was greater than about 90%.

What I claim is:

1. A method for the recovery of tungsten carbide inserts from worn steel drilling bits, which comprises:
    subjecting said bits to acid treatment in an acid treatment bath for a time at least sufficient to eat away any turned over burrs from around said inserts,
    heating said acid treated bits to an elevated temperature at least sufficient to loosen said inserts within their sockets in said bits so that they may be removed by strong vibration, and
    subjecting the heated bits to strong vibration to dislodge said inserts from their sockets.

2. The method of claim 1 wherein said acid treatment is effected for a period sufficient to eat steel away from said inserts so that they project from the bit surface upon completion of said acid treatment.

3. The method of claim 1 wherein said acid treatment is effected using sulphuric acid.

4. The method of claim 1, 2 or 3, wherein said acid treatment is effected at an elevated temperature.

5. The method of claim 1, 2 or 3, wherein said acid treatment is effected at an elevated temperature of about 150° to about 200° F.

6. The method of claim 1 wherein said elevated temperature to which said acid treated bits is heated is at least about 1600° F.

7. The method of claim 1 or 6 wherein said strong vibration to which the heated bits are subjected may be achieved by striking the heated bits with a jack hammer.

8. The method of claim 5 wherein said elevated temperature to which said acid treated bits is heated is at least about 1600° F.

9. The method of claim 8 wherein said strong vibration to which the heated bits are subjected may be achieved by striking the heated bits with a jack hammer.

10. The method of claim 1 or 6 wherein said drilling bits are tricones or split roller bits.

11. The method of claim 5 wherein said drilling bits are tricones or split roller bits.

12. The method of claim 7 wherein said drilling bits are tricones or split roller bits.

13. A method for the recovery of tungsten carbide inserts from worn steel drilling cross-bits, which comprises:
    heating said bits to an elevated temperature at least sufficient to loosen said inserts from within their sockets in said bits, and
    removing said loosened inserts from their sockets.

14. The method of claim 13 including heating said bits in a rotary kiln at an elevated temperature of at least about 1300° C. and ejecting the heated bits from the kiln onto a grate through which the removed inserts fall into a receptacle.

* * * * *